UNITED STATES PATENT OFFICE.

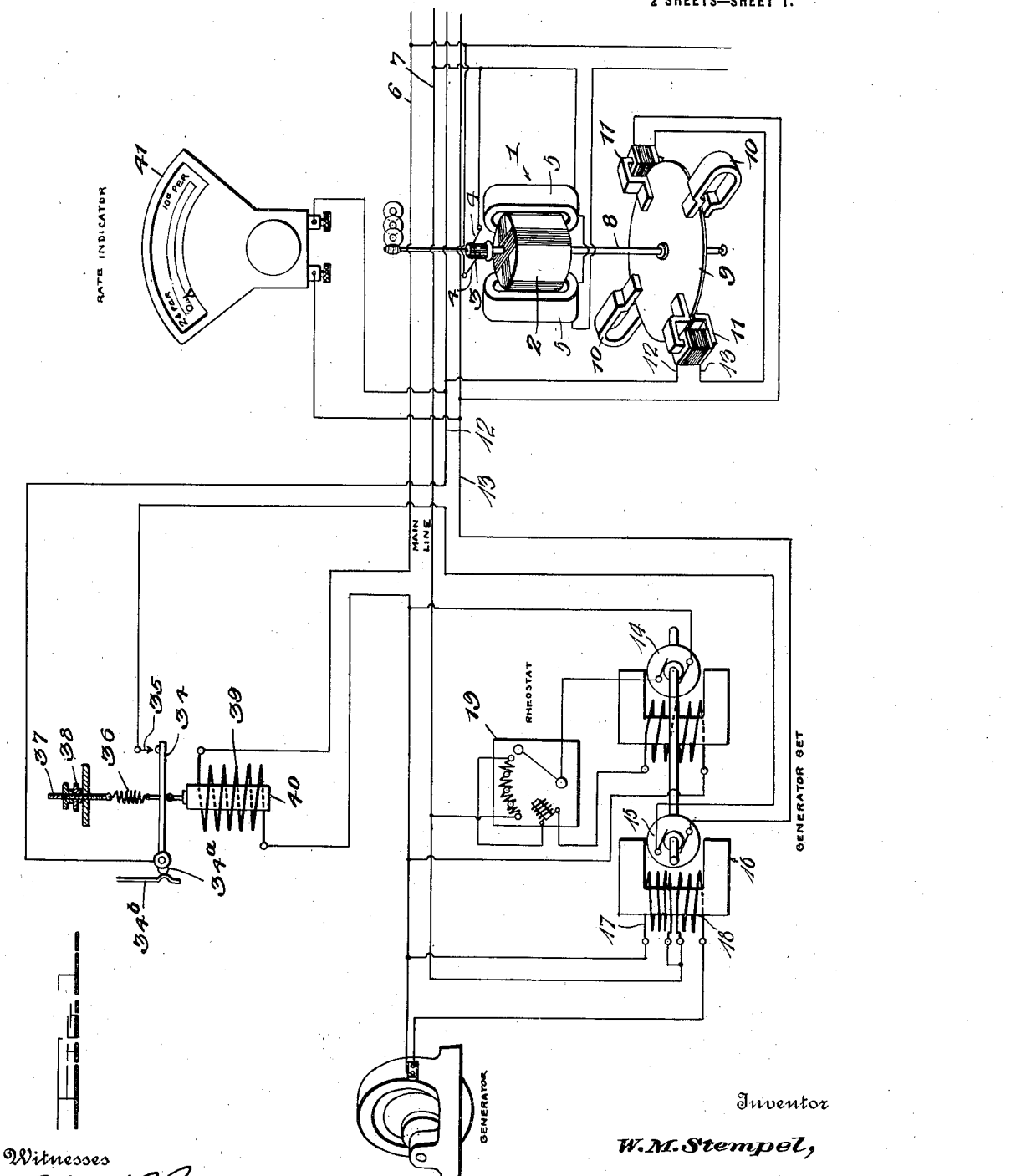

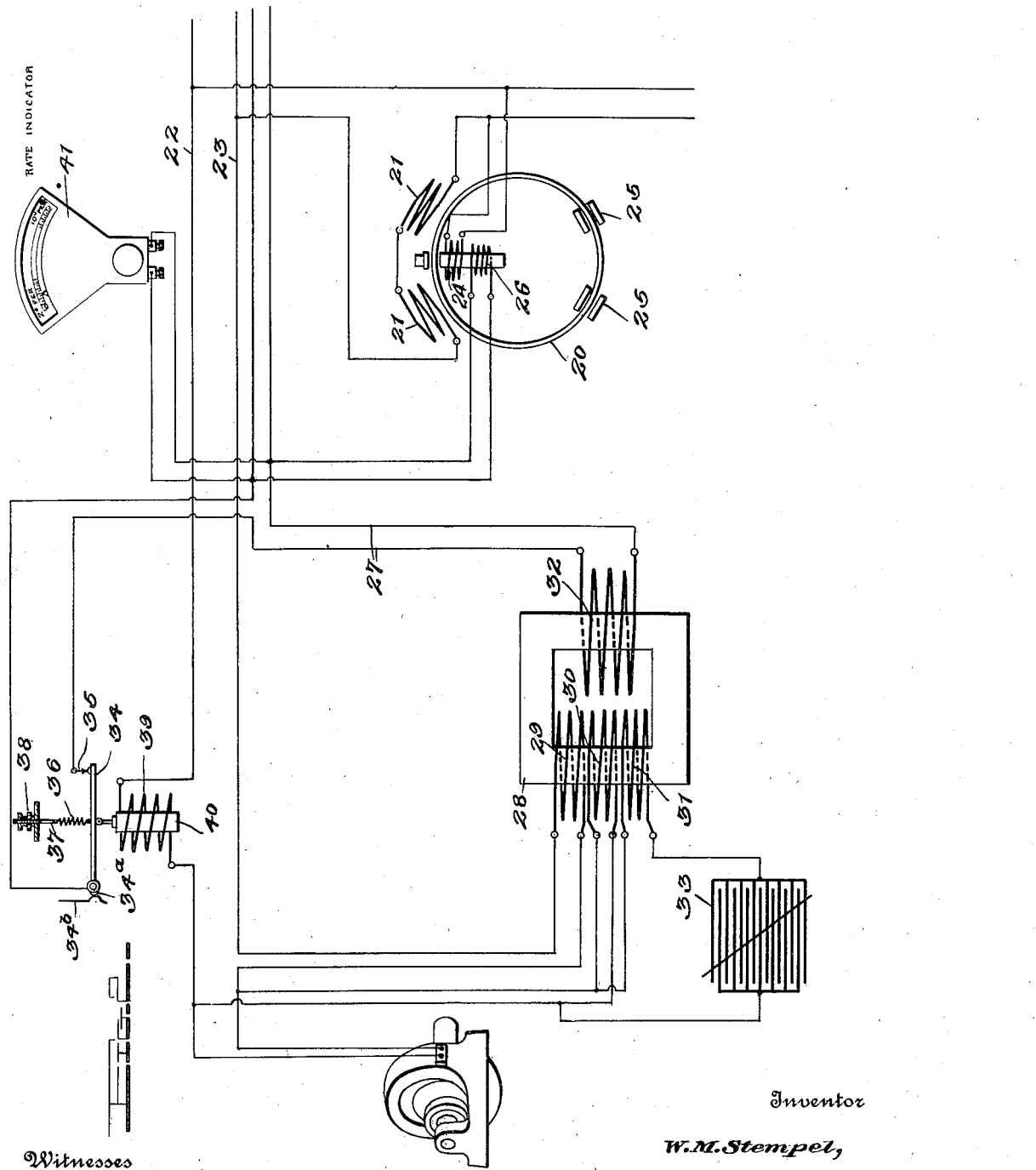

WALDEMAR M. STEMPEL, OF STATE COLLEGE, PENNSYLVANIA.

ELECTRIC METER.

1,138,513. Specification of Letters Patent. Patented May 4, 1915.

Application filed February 27, 1913. Serial No. 751,076.

*To all whom it may concern:*

Be it known that I, WALDEMAR M. STEMPEL, citizen of the United States, residing at State College, in the county of Center and State of Pennsylvania, have invented certain new and useful Improvements in Electric Meters; and I do declare the following to be a full, clear, and exact description of the invention, such as will enable others skilled in the art to which it appertains to make and use the same.

This invention relates to improvements in electric meters and particularly to means for controlling the same from the power house.

One object of the invention is to provide a meter having a controlling mechanism whereby electric current may be served to customers at reduced rates during certain hours and at full rates at other hours.

Another object of the invention is to provide means whereby the controlling mechanism of the meter is automatically regulated at the power house.

A further object is to provide means for indicating to the customer exactly what rate he is paying at all times.

With these and other objects in view, the invention consists of certain novel features of construction, combination and arrangement of parts as will be more fully described and claimed.

Figure 1 is a diagrammatic view of a direct current electric supply system and meter showing the application of my improved controlling mechanism. Fig. 2 is a similar view of an alternating current supply system and meter showing the application of the invention thereto.

Referring more particularly to Fig. 1 of the drawings wherein the invention is shown applied to a Thompson watt-hour direct current meter, 1 denotes the motor, one end of the shaft of which is geared to the usual or any approved mechanism for registering the energy consumed. The motor 1 comprises the armature 2 having the usual commutator 3, brushes 4, and field magnets 5. The brushes 4 and magnets 5 are connected to the line wires 6 and 7 in the usual manner whereby the current which passes through the coils of the armature is proportional to the voltage across the line owing to the high resistance of these coils, while the current which passes through the coils of the field magnets 5 is the total current used by the load. The pull on the armature will thus be equal to the product of the voltage on the line and the total current used or simply the power delivered. Fixed on the armature shaft 8 near its lower end is an aluminum disk 9 which rotates freely between the poles of one or more suitably supported permanent magnets 10 which act as a drag on the disk 9. The magnets 10 are of such strength that the drag applied thereby to the disk will be proportional to the speed of rotation which produces the conditions desired in a watt-hour meter, and it follows that the total angular distance traveled by the armature will be proportional to the total energy consumed. If the shaft of the armature is properly connected up to a calibrated dial the total energy consumed will be thereby added up and recorded.

The parts described in the foregoing are old and well known to the profession and do not form a part of the present invention which as hereinbefore intimated, comprises means for automatically controlling the speed of the motor from the power house thereby causing the meter to register more slowly at certain times.

In carrying out my invention I provide one or more electro-magnets 11 which are suitably supported in the casing of the meter in such position that the disk 9 will revolve between the poles of the magnets as shown. The circuit or current conducting wires 12 and 13, of the magnets 11, and which for convenience I will designate as pilot wires run to the power house and are there connected with an automatically operated controlling or energizing mechanism which will now be described.

The energizing mechanism for the electromagnets 11, comprises a motor-generator set consisting of a motor 14 on the shaft of which is also mounted the armature 15 of a generator 16 which is driven by the motor in the usual manner. The generator 16 has a shunt coil 17 and a series coil 18. The shunt coil is connected direct across the line, while the series coil is connected in series with the main bus-bars of the station so that the total current going out from the station goes through the series coil. The terminals of the armature of this generator are connected to the pilot wires 12 and 13 which in turn connect with the controlling magnets 11 in the customers' meters as hereinbefore described. The shunt coil 17 and the series coil 18 are so connected that the current flows therethrough in opposite directions. It will thus be seen that when the power station is delivering but little power, the series coil 18 is not effective. The generator 16 is then delivering its maximum potential to the pilot wires thereby energizing the electro-magnets 11 to their greatest extent which causes a heavy drag on the disk 9, causing the meter to record more slowly. By this retardation the customer will obtain his energy or power at the minimum rates. As the load on the station increases the series coil 18 becomes more and more effective until, when the station is carrying its full load, the series coil 18 is designed to just neutralize the shunt coil 17. When this occurs the generator will deliver no potential to the magnets 11 thereby permitting the motor 1 to travel at normal speed at which time the power is supplied to customer at the maximum rates. The intermediate loads at the station will have a graduated effect on the meter by energizing the magnets 11 to a greater or less extent. Assuming that the customer is to pay a constant rate per kilo-watt-hour, the arrangement herein described has the effect of giving the customer more energy for the same amount of money or at a lower rate as will be readily understood. The motor 14 is connected with the line wires 6 and 7 in any suitable manner. In the present instance a shunt motor is shown, connected to the lines through a starting rheostat 19.

In the form of the invention hereinbefore described it has been assumed that the coils regulating or controlling the magnets 11 of the various meters are connected in parallel to the wires feeding the same.

As stated in the beginning of this specification the arrangement as hereinbefore described is preferably used on direct current lines but the same may be used on alternating current lines.

In Fig. 2 of the drawings the invention is shown applied to a different form of meter, and as having a slightly different arrangement of automatic controlling mechanism at the power station. This latter form of the invention is designed to be used exclusively on alternating current lines. The type of the instrument shown in Fig. 2 is known to the profession as an induction meter and is generally used in alternating current systems because of its simplicity of construction and lack of a commutator, which, as is well known, necessarily retards the motion of the rotating part of the meter.

The motor shown in Fig. 2 comprises a revolubly mounted hollow cylinder 20 formed of aluminum. Suitably supported adjacent to the outer side of the cylinder 20 are a series of coils 21 which are connected directly to the line wires 22 and 23 and carry the total current delivered to the load. Suitably supported adjacent to the inner side of the cylinder 20 is a high resistance coil 24 which is connected to the line wires as shown and carries a current proportional to the voltage across the line. The high inductance of this coil also makes the current therein lag behind that in the coils 21 thus producing the effect of a rotating field which causes the cylinder 20 to revolve. The pull thus produced on the cylinder is, however, proportional to the product of the currents flowing in the coils 21 and 24 and therefore to the power. As in the first form of motor, permanent magnets 25 are provided in connection with the last described motor. The poles of these magnets 25 are disposed on opposite sides of the cylinder 20 as shown. The magnets 25 drag on the cylinder in direct proportion to the speed and since the pull of the coils 21 and 24 is proportional to the power, it follows that the angular distance traveled by the aluminum cylinder will be proportional to the total energy consumed so that if the rotating cylinder 20 is connected by means of suitable gearing to a properly calibrated dial, this instrument can be made to sum up and record the total energy consumed in kilo-watt-hours. The parts of this last form of meter which have just been described are well known and have been herein particularly described simply to enable the invention which is applied thereto and hereinafter described, to be more readily understood. The invention in this instance comprises a coil 26 arranged on the core of the coil 24 and connected with pilot wires 27 running back to the power house so that the current in the coil 26 will be exactly 180 degrees behind or ahead of that in the coil 24 as regards phase. By this arrangement the coil 26 when energized, would counteract the effect of the coil 24 and cause the meter to run more slowly than when the coil 26 is not energized. This, as in the first form of the invention would give the customer a lower rate. The direct current control or pilot circuit could be used with this instrument by substituting for the coil 26 the electromagnets 11 shown in Fig. 1 in which arrangement these magnets would be disposed with their poles on opposite sides of the cylinder as will be readily understood. While this last mentioned arrangement is not the most desirable there might be occasions when the same would be preferred. The apparatus at the power station for automatically supplying the proper potential to the pilot wires 27 of the controlling coil 26 comprises a transformer 28 having three coils 29, 30 and 31 on the primary, and one coil 32 on the secondary.

The coil 29 is connected in series with the main line wires and carries the entire current from the power station. The coils 30 and 31 are two potential coils used to produce a constant field. The coil 30 is simply a very high resistance coil, but owing to its high inductance the current in it will lag some behind the current in the coil 29. To bring it (or rather, the effect of the two) back into phase with the coil 29, the coil 31 with a condenser 33 in series therewith, is added to the transformer and the value of the condenser is chosen to make the coil 31 lead the coil 29 by the same amount as the coil 30 lags behind 29. It might be here stated that either of the shunt coils 30 or 31 may be dispensed with in some instances. It has been found in practice that some power circuits will require one of these coils, while other circuits will require the other or both of the coils as herein described. The secondary coil 32 of the transformer is connected to the pilot wires 27 leading to the controlling coil 26 in the meter. By this arrangement it will seem that when the power station is carrying no load the coil 29 is inactive and the coils 30 and 31 induce in the coil 32 the maximum voltage. Coil 29 is so connected as to oppose the coils 30 and 31 and as the load on the line increases the coil 29 becomes more and more active, but being connected in opposition to the coils 30 and 31 will reduce the voltage on the pilot wires thus gradually deënergizing or reducing the power of the controlling coil 26 in the meter until the full load is being delivered over the line and through the coil 29. The coil 29 will at this time exactly neutralize the coils 30 and 31 thus rendering the coil 32 and the coil 26 in the meter inactive. The customers' meters are thus made to change their speed for a given power consumption, from a maximum to a minimum according to whether the power station is carrying a full load or a light load.

It will be noted that if the load at the power station is increased beyond a full load in the arrangement just described, the rate recorded by the meters, would begin to decrease again, owing to the overpowering of the coil 29. This effect can be eliminated in two ways. One way is to wind the coils so that the neutralization takes place at the allowable overload instead of at full load, or to add to the equipment an automatically operated cut out, hereinafter described, which breaks the circuit of the controlling coils in the meters after a full load has been reached. The first method would have the effect of further increasing the rate after reaching the full load, which might be objectionable.

The circuit breaker or cut out for the circuit of the controlling coils, hereinbefore referred to, comprises a switch arm 34 which is arranged in and positively connected at one end to one terminal of the wires and has its other end normally held in engagement with the other terminal or contact point 35 of the wires by a coiled spring 36. The spring 36 has its opposite end connected with an adjusting screw 37 which is mounted in a suitable support and has thereon an adjusting nut 38 whereby this tension of the spring 36 is regulated. Arranged in the main line circuit wires is a solenoid 39 the core 40 of which is connected with the switch arm 34 as shown. When thus arranged the entire current from the power plant goes through the coil of the solenoid. The tension of the spring 36 is so adjusted that when the current passing through the solenoid reaches its full load value the core 40 of the solenoid will be retracted against the resistance of the spring 36 thus disengaging the switch arm 34 from the contact terminal 35 in the pilot wire circuit and breaking the latter. When the pilot wire circuit is thus broken the controlling coils in the meters are immediately deënergized which will permit the meters to record at full rate until the load at the power station is again reduced whereupon the current in the solenoid is reduced to a sufficient extent to permit the spring 36 to again close the switch arm of the controlling coil circuit thus again energizing the controlling coils in the meters to a greater or less extent in the manner described. In order to prevent vibration of the switch arm and the consequent sparking at the contact point 35 when the switch arm is opened and closed, I preferably provide the pivoted end of the switch arm with a cam projection 34$^a$ with which is engaged a light curved spring 34$^b$ the pressure of which steadies the switch arm and positively holds the same in an open or closed position.

While the circuit breaker has been particularly described in connection with the induction meter, it is obvious that this circuit breaker may be employed with equal advantage with the Thompson type of meter and is here shown as being also arranged in the circuit of this form of the invention.

It will be understood from the foregoing that during "off peak" periods, the meters do not measure or record actual kilo-watt hours, but instead, what might be called, equivalent kilo-watt hours, because the meters are running more slowly on "off peak" periods than at "peak" periods for the same rate of energy consumption. In this case the equivalent kilo-watt hours would mean such a number of actual kilo-watt hours which at the maximum rate would amount to the same money value as the actual kilo-watt hours charged at their various rates. Since in either the Thompson type of meter, or the induction type, herein described, the actual kilo-watt hours are not recorded during the "off peak" periods, the scale of measurement on the dial will necessarily have to be differently marked. Possibly "equivalent kilo-watt hours" might be used as previously explained but it is much more preferable to calibrate the face of the dials in dollars and cents. In addition each meter may be provided with a rate indicator 41 having its scale calibrated so that it reads the maximum rate, (for instance 10 cents per kilo-watt hour) when there is no current flowing through the rate indicator, and the minimum rate (for instance 2 cents per kilo-watt hour) when the maximum current is passing through the pilot wire circuit and through the rate indicator.

It will be plain from the foregoing that when the current in the pilot wire circuit is zero, the rate for power is at maximum and that when the current in the pilot wire circuit is maximum the rate for power is minimum. It follows therefore, that if the rate indicator 41 be placed in the pilot wire circuit next to the meter, and so adjusted and the scale on the dial thereof, so calibrated that it shows the maximum and minimum rates as above described, the rate indicator becomes, in a way, a load factor meter, which will indicate to the customer what rate he is paying at any moment, for the power he is using.

The rate indicator 41 may be of a very inexpensive type and if desired, can be made an integral part of the meter with which it is used.

The arrangement as herein shown and described enables the electrical company to give all customers the benefit of a multiple rate without having to depend on the honesty of the customer who in case of reduced rates does not need to be asked to use power during certain hours of the day. The rate indicator is desirable to the customer because it indicates to them just what the company is doing. It will also be seen that the invention as a whole makes it possible to treat all customers alike, to reduce the complications of the rate sheet, and to simplify the handling of accounts.

I desire to here state that any or all of the devices used in the art to correct meters for changes of power factor, frequency, or for any purpose are applicable to the meters herein described and that my improvements as herein specified may be applied to any standard meters without modifying the same except in minor mechanical details.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, I claim:

1. In a system of distribution, the combination of a generator, a load circuit supplied thereby, a meter including a rotary element, an auxiliary circuit, means included in said load circuit and controlling said auxiliary circuit whereby the energization of the latter will be inversely proportional to the load on the former, and means in said auxiliary circuit to influence the rotation of said rotary element substantially as and for the purpose set forth.

2. In a system of distribution the combination of a generator, a load circuit supplied thereby, an electric meter including a rotary element, means coöperating with the latter to retard the same, an auxiliary circuit including said means, a source of supply for said auxiliary circuit and means included in the load circuit for controlling said source of supply whereby the output of the latter will be inversely proportional to that of the former.

3. In a system of electrical distribution, the combination with a current generator, and an electrical meter provided with a damping disk; of electric retarding devices applied thereto, a supplemental generator connected with said retarding devices, and means included in the circuit of said current generator for controlling the field of said supplemental generator, whereby when said current generator is delivering full load said supplemental generator will be inactive and the retarding devices in the meters thereby deënergized and whereby as the load decreases said supplemental generator becomes more and more active thereby energizing said retarding devices and causing the meter to record more slowly.

4. In a system of electrical distribution, the combination with a current generator, and an electrical meter provided with a damping disk; of a supplemental generator set of electro-magnets within whose fields said damping disk is located, said magnets having windings in circuit with said supplemental generator and means included in the circuit of said current generator for controlling the field of said supplemental generator, whereby when the said current generator is delivering full load said supplemental generator and the magnets in circuit therewith will be rendered inactive, and whereby as the load decreases said supplemental generator will become more and more active thereby energizing said electro-magnets and causing the meter to record more slowly.

5. In a system of electrical distribution, the combination with a current generator, and an electrical meter provided with a damping disk; of a supplemental generator, retarding devices applied to said damping disk and included within the circuit of said supplemental generator, means connected with said current generator for controlling the field of said supplemental generator whereby said retarding devices may be energized and deënergized in accordance with the load on said current generator, a circuit breaker arranged in the circuit of said supplemental generator, and means in the circuit of said current generator and automatically operated when the latter is delivering full load to operate said circuit breaker, thereby breaking the circuit of said supplemental generator.

6. In an electric power distributing system, a meter having a motor, a disk fixed on the shaft of said motor, electro-magnets arranged in position to act as a drag on said disk whereby the speed of the motor is controlled, an electric circuit connected with said magnets and extending to the power station of the system, a motor generator set arranged at the power station in the circuit of said electromagnets and connected with the line wires of the system, a series coil arranged on said generator and connected in series with the line circuit, a shunt coil arranged on said generator in opposition to said series coil and connected across the line whereby when the load on the line is full said series coil will neutralize said shunt thereby rendering said generator inactive and deënergizing the electro-magnets in the meter and whereby as the load on the line decreases said series coil will become less active and the shunt coil more active, thus energizing said electro-magnets to a greater or lesser degree.

In testimony whereof I have hereunto set my hand in presence of two subscribing witnesses.

WALDEMAR M. STEMPEL.

Witnesses:
 C. E. GOVIER,
 A. L. JOHNSTON.